UNITED STATES PATENT OFFICE.

BUTLER G. NOBLE, OF WHITEWATER, WISCONSIN.

IMPROVEMENT IN TANNING LEATHER.

Specification forming part of Letters Patent No. 19,201, dated January 26, 1858.

*To all whom it may concern:*

Be it known that I, BUTLER G. NOBLE, of Whitewater, in the county of Walworth and State of Wisconsin, have invented a new and Improved Process of Tanning Leather; and I do hereby declare that the following is a full, clear, and exact description thereof.

To enable others skilled in the art to use my invention, I will proceed to describe the process.

One hundred calf-skins, having been previously prepared by depilating and bating in any of the usual modes, are immersed in a preparation consisting of ten pounds of catechu dissolved in a sufficient quantity of water to cover the skins. In this they are kept in motion for two or three hours until well colored, when I add ten pounds more of catechu to the solution, and permit them to remain, with occasional handling, from fifteen to twenty-four hours. They are then removed, and I add to the vat containing the liquor fifteen pounds of catechu, ten pounds of sulphate of soda, and two pounds of common salt. The skins are then immersed in the liquor and allowed to remain, with the addition of ten pounds of catechu each day thereafter until tanned, which is usually from five to ten days. They are then removed, and I prepare a new liquor consisting of water sufficient to cover the skins; catechu, five pounds; alum, three pounds; and common salt, one pound. In this the skins are placed and remain about twenty-four hours, when they are removed. I then prepare what I distinguish as the "fixing-bath," consisting of water sufficient to cover the skins, to which I add one ounce of commercial nitric acid, and one-half ounce of glycerine to every four gallons of the water. In this the skins are placed, and, with frequent handling, remain from six to eighteen hours, or until they have assumed a bright and suitable color, which may be varied by the time of immersion to suit the fancy. They are then taken out and well rinsed to insure the removal of all free acid, when they are ready for the currier. The skins, during the whole process, should be handled daily and freely exposed to the air. Heavy hides require more time; but the same relative proportions of the ingredients and order of their use should be observed. Instead of catechu, other agents containing an equivalent of tannin and extractive may be employed.

The solution of the catechu is best effected by boiling in water in the proportion of about five pounds of catechu to one gallon of water. The vessels used for this purpose, if of iron or copper, should be well tinned or otherwise protected from the action of the tannic acid. Otherwise a greenish color will be imparted to the leather. All the solutions should be used at ordinary temperatures.

The use of the sulphate of soda and common salt exerts an important influence by promoting the absorption of tannin. The fixing solution I regard as important in imparting to the leather a certain firmness of texture and flexibility not otherwise attainable. The glycerine in the fixing solution tends to the production of whiter leather by developing oxalic acid in combining with the nitric acid, which acts as a bleaching agent, and at the same time modifies the otherwise corrosive quality of the nitric acid.

By this process of tanning the time is greatly shortened and the expense reduced by dispensing with the machinery and extensive apparatus indispensable to the common modes, while the leather produced is of the best quality.

I am aware that sulphate of soda, chloride of sodium, alum, and nitric acid have been used in different proportions and combinations in other processes of tanning, and therefore do not claim their use in any manner differing substantially from my own.

What I claim as my invention, and desire to secure by Letters Patent, is—

The fixing-bath composed of nitric acid and glycerine diluted with water in the proportions specified, or thereabout, and employed substantially in the manner herein set forth.

BUTLER G. NOBLE.

Witnesses:
  H. W. BEERS,
  CHARLES F. THRASHER.